(12) United States Patent
Cash et al.

(10) Patent No.: US 11,867,516 B2
(45) Date of Patent: Jan. 9, 2024

(54) VEHICLE MANUAL GUIDANCE SYSTEMS WITH STEERING WHEEL ANGLE SENSORS AND ROAD WHEEL ANGLE SENSORS

(71) Applicant: Trimble Inc., Sunnyvale, CA (US)

(72) Inventors: Michael F. Cash, Mountain View, CA (US); Shannon Smith, Sunnyvale, CA (US)

(73) Assignee: Trimble Inc., Sunnyvale, CA (US)

( * ) Notice: Subject to any disclaimer, the term of this patent is extended or adjusted under 35 U.S.C. 154(b) by 405 days.

(21) Appl. No.: 16/927,447

(22) Filed: Jul. 13, 2020

(65) Prior Publication Data

US 2020/0340819 A1 Oct. 29, 2020

Related U.S. Application Data

(62) Division of application No. 16/045,900, filed on Jul. 26, 2018, now Pat. No. 10,753,752.

(51) Int. Cl.
*G01C 21/34* (2006.01)
*A01B 69/04* (2006.01)
(Continued)

(52) U.S. Cl.
CPC ........ *G01C 21/3407* (2013.01); *A01B 69/008* (2013.01); *B62D 15/0295* (2013.01);
(Continued)

(58) Field of Classification Search
None
See application file for complete search history.

(56) References Cited

U.S. PATENT DOCUMENTS 8,473,144 B1 6/2013 Dolgov et al.
8,996,228 B1 3/2015 Ferguson et al.
(Continued)

FOREIGN PATENT DOCUMENTS

CA 2071831 A1 * 6/1991 ............. G01C 21/00
CA 3066764 A1 * 12/2018 ........... A01B 69/001
(Continued)

OTHER PUBLICATIONS

English Translation for KR-20170111084 A (Year: 2017).*
(Continued)

*Primary Examiner* — Thomas E Worden
(74) *Attorney, Agent, or Firm* — Kilpatrick Townsend & Stockton LLP

(57) ABSTRACT

A system for providing manual guidance of a vehicle includes a first inertial measurement unit (IMU) attached to a steering wheel, a second IMU attached to a fixed part of the vehicle, a global navigation satellite systems (GNSS) receiver, a data storage device for storing a pre-planned path, and a feedback module. The feedback module is configured to determine a current angle of the steering wheel, determine a deviation of the current position of the vehicle from the pre-planned path, determine a current heading of the vehicle, determine a current velocity of the vehicle, and determine a desired angle of the steering wheel relative to the vehicle. The system further includes a user interface configured to provide a visual indication of the desired angle of the steering wheel or a deviation of the current angle of the steering wheel from the desired angle of the steering wheel.

12 Claims, 10 Drawing Sheets

(51) Int. Cl.
  *B62D 15/02* (2006.01)
  *G01C 21/18* (2006.01)
  *G01C 21/28* (2006.01)
  *G01C 21/36* (2006.01)
  *G01S 19/13* (2010.01)
  *G01S 19/51* (2010.01)

(52) U.S. Cl.
  CPC .............. *G01C 21/18* (2013.01); *G01C 21/28* (2013.01); *G01C 21/36* (2013.01); *G01S 19/13* (2013.01); *G01S 19/51* (2013.01)

(56) References Cited

U.S. PATENT DOCUMENTS

| | | | |
|---|---|---|---|
| 9,164,511 B1 | 10/2015 | Ferguson et al. | |
| 10,247,573 B1 | 4/2019 | Gavrilets et al. | |
| RE47,648 E | 10/2019 | Reeve et al. | |
| 10,753,752 B2 | 8/2020 | Cash et al. | |
| 2005/0060093 A1* | 3/2005 | Ford | G01C 21/165 701/472 |
| 2007/0088477 A1* | 4/2007 | Brewer | A01B 69/008 701/41 |
| 2014/0168009 A1 | 6/2014 | Peake | |
| 2016/0147225 A1 | 5/2016 | Sights et al. | |
| 2016/0223683 A1 | 8/2016 | Boyarski | |
| 2018/0088590 A1 | 3/2018 | Zhu et al. | |
| 2018/0148085 A1 | 5/2018 | Tan et al. | |
| 2018/0292212 A1* | 10/2018 | Bobye | G01C 25/005 |
| 2019/0073762 A1 | 3/2019 | Kean | |
| 2019/0078895 A1 | 3/2019 | Ma et al. | |
| 2019/0114911 A1 | 4/2019 | Rezaei et al. | |
| 2019/0138000 A1 | 5/2019 | Hammond et al. | |
| 2019/0384303 A1* | 12/2019 | Muller | G01C 21/3407 |
| 2020/0011629 A1 | 1/2020 | Deng et al. | |
| 2020/0025943 A1 | 1/2020 | Lemaire | |
| 2020/0029490 A1 | 1/2020 | Bertucci et al. | |
| 2021/0207961 A1* | 7/2021 | Saini | G01C 25/005 |
| 2022/0042802 A1* | 2/2022 | Saini | G01S 19/40 |

FOREIGN PATENT DOCUMENTS

| | | | | |
|---|---|---|---|---|
| CA | 3079580 A1 | * | 10/2020 | .......... A01B 69/001 |
| KR | 20170111084 A | * | 10/2017 | |
| WO | WO-2014186258 A1 | * | 11/2014 | .......... A61B 69/008 |
| WO | 2017/110116 A1 | | 6/2017 | |
| WO | 2018/067473 A1 | | 4/2018 | |

OTHER PUBLICATIONS

International Search Report and Written Opinion for Application No. PCT/US2019/040952, dated Oct. 17, 2019, 13 pages.
Pre-Interview First Office Action for U.S. Appl. No. 16/045,900, dated Mar. 30, 2020, 6 pages.
U.S. Appl. No. 16/045,900 Notice of Allowance dated May 12, 2020, 11 pages.

\* cited by examiner

VEHICLE MANUAL GUIDANCE SYSTEMS WITH STEERING WHEEL ANGLE SENSORS AND ROAD WHEEL ANGLE SENSORS

CROSS-REFERENCES TO RELATED APPLICATIONS

This is a divisional application of U.S. patent application Ser. No. 16/045,900, filed on Jul. 26, 2018, entitled VEHICLE MANUAL GUIDANCE SYSTEMS WITH STEERING WHEEL ANGLE SENSORS AND ROAD WHEEL ANGLE SENSORS, the content of which is incorporated by reference in its entirety.

BACKGROUND

In operating an agricultural vehicle such as a tractor or a harvester, it is often desirable for the vehicle to follow a pre-planned path over an area, for example when planting a field. Deviating from the pre-planned path may result in damaged crops, overplanting, reduced yield per acre, and the like. Following pre-planned paths may also be desirable for other types of vehicles and operations, such as road side spraying, road salting, and snow plowing. Therefore, it may be desirable to provide manual guidance to a human operator of the vehicle so that the human operator may change a steering wheel angle accordingly to correct a deviation from the pre-planned path.

SUMMARY

According to some embodiments of the present invention, a system for providing manual guidance of a vehicle includes a first inertial measurement unit (IMU) attached to a steering wheel of the vehicle, and a second IMU attached to a fixed part of the vehicle displaced from the steering wheel. The first IMU includes a first three-axis accelerometer and a first three-axis gyroscope. The second IMU includes a second three-axis accelerometer and a second three-axis gyroscope. The system further includes a global navigation satellite systems (GNSS) receiver attached to the vehicle and configured to receive GNSS satellite signals and determine a current position of the vehicle based on the GNSS satellite signals. The system further includes a data storage device for storing a pre-planned path, and a feedback module coupled to the first IMU, the second IMU, the GNSS receiver, and the data storage device. The feedback module is configured to determine a current angle of the steering wheel relative to the vehicle based on a previously estimated angle of the steering wheel relative to the vehicle, readings of the first IMU, and readings of the second IMU, determine a deviation of the current position of the vehicle from the pre-planned path by comparing the current position of the vehicle to the pre-planned path, determine a current heading of the vehicle based on a previously estimated heading of the vehicle and the readings of the second IMU, determine a current velocity of the vehicle based on readings of the second IMU, and determine a desired angle of the steering wheel relative to the vehicle based on the current angle of the steering wheel, the deviation of the current position of the vehicle from the pre-planned path, the current heading of the vehicle, and the current velocity of the vehicle. The system further includes a user interface coupled to the feedback module. The user interface is configured to provide a visual indication of the desired angle of the steering wheel or a deviation of the current angle of the steering wheel from the desired angle of the steering wheel, thereby providing visual guidance to an operator of the vehicle for adjusting an angle of the steering wheel so that the vehicle follows the pre-planned path.

According to some other embodiments of the present invention, a system for providing manual guidance of a vehicle includes a first inertial measurement unit (IMU) attached to a road wheel of the vehicle, and a second IMU attached to a fixed part of the vehicle displaced from the road wheel. The first IMU includes a first three-axis accelerometer and a first three-axis gyroscope. The second IMU includes a second three-axis accelerometer and a second three-axis gyroscope. The system further includes a global navigation satellite systems (GNSS) receiver attached to the vehicle and configured to receive GNSS satellite signals and determine a current position of the vehicle based on the GNSS satellite signals. The system further includes a data storage device for storing a pre-planned path, and a feedback module coupled to the first IMU, the second IMU, the GNSS receiver, and the data storage device. The feedback module is configured to determine a current angle of the road wheel in a yaw axis relative to the vehicle based on a previously estimated angle of the road wheel in the yaw axis relative to the vehicle, readings of the first IMU, and readings of the second IMU, determine a current heading of the vehicle based on a previously estimated heading of the vehicle and the readings of the second IMU, determine a deviation of the current position of the vehicle from the pre-planned path by comparing the current position of the vehicle to the pre-planned path, determine a current velocity of the vehicle based on readings of the second IMU, and determine a desired angle of the road wheel in the yaw axis relative to the vehicle based on the current angle of the road wheel in the yaw axis relative to the vehicle, the deviation of the current position of the vehicle from the pre-planned path, the current heading of the vehicle, and the current velocity of the vehicle. The system further includes a user interface coupled to the feedback module. The user interface is configured to provide visual information relating of the desired angle of the road wheel in the yaw axis or a deviation of the current angle of the road wheel in the yaw axis from the desired angle of the road wheel in the yaw axis, thereby providing visual guidance to an operator of the vehicle for adjusting an angle of a steering wheel so that the vehicle follows the pre-planned path.

According to some further embodiments of the present invention, a method of providing manual guidance to an operator of a vehicle includes tracking a gravity vector using a first three-axis accelerometer attached to a steering wheel of the vehicle, measuring a rate of rotation of the steering wheel in each of a roll axis, a pitch axis, and a yaw axis using a first three-axis gyroscope attached to the steering wheel according to the gravity vector, and measuring a rate of rotation of the vehicle in each of the roll axis, the pitch axis, and the yaw axis using a second three-axis gyroscope attached to a fixed part of the vehicle displaced from the steering wheel. The method further includes determining a current angle of the steering wheel relative to the vehicle based on a previously estimated angle of the steering wheel relative to the vehicle, the rate of rotation of the steering wheel in each of the roll axis, the pitch axis, and the yaw axis, and the rate of rotation of the vehicle in each of the roll axis, the pitch axis, and the yaw axis. The method further includes determining a current heading of the vehicle based on a previously estimated heading of the vehicle and the rate of rotation of the vehicle in the yaw axis, determining a current position of the vehicle using a global navigation satellite systems (GNSS) receiver attached to the vehicle, determining a deviation of the current position of the vehicle from a pre-planned path by comparing the current position of the vehicle to the pre-planned path, and determining a current velocity of the vehicle using a second three-axis accelerometer attached to the vehicle. The method further includes determining a desired angle of the steering wheel relative to the vehicle based on the deviation of the current position of the vehicle from the pre-planned path, the current angle of the steering wheel relative to the vehicle, the current heading of the vehicle, and the current velocity of the vehicle, and providing visual information on a user interface. The visual information indicates the desired angle of the steering wheel or a deviation of the current angle of the steering wheel from the desired angle of the steering wheel, thereby providing visual guidance to the operator of the vehicle for adjusting an angle of the steering wheel so that the vehicle follows the pre-planned path.

DETAILED DESCRIPTION

Figure 1:
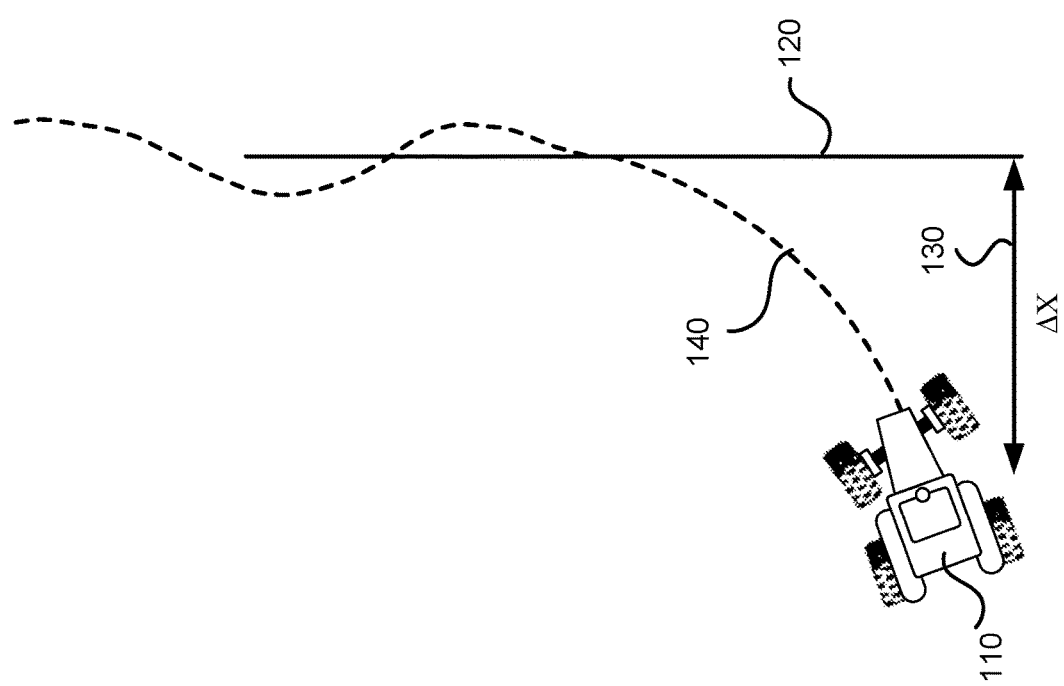
FIG. 1 illustrates cross-track errors of a vehicle from a pre-planned path.

In a manual guidance system, pre-planned paths may be transmitted to an on-board display. One method of providing manual guidance may be to display an offline distance or cross-track error, for example in a light bar, to alert to a human operator to make necessary corrections. For instance, in the example illustrated in FIG. 1, the current position of the vehicle 110 deviates from the pre-planned path 120 to the left by a cross-track error A 130. A manual guidance system may indicate the cross-track error on a light bar (or other type of display) on a dashboard of the vehicle, so that the human operator may change the steering wheel angle accordingly to correct the cross-track error 130.

Figure 2:
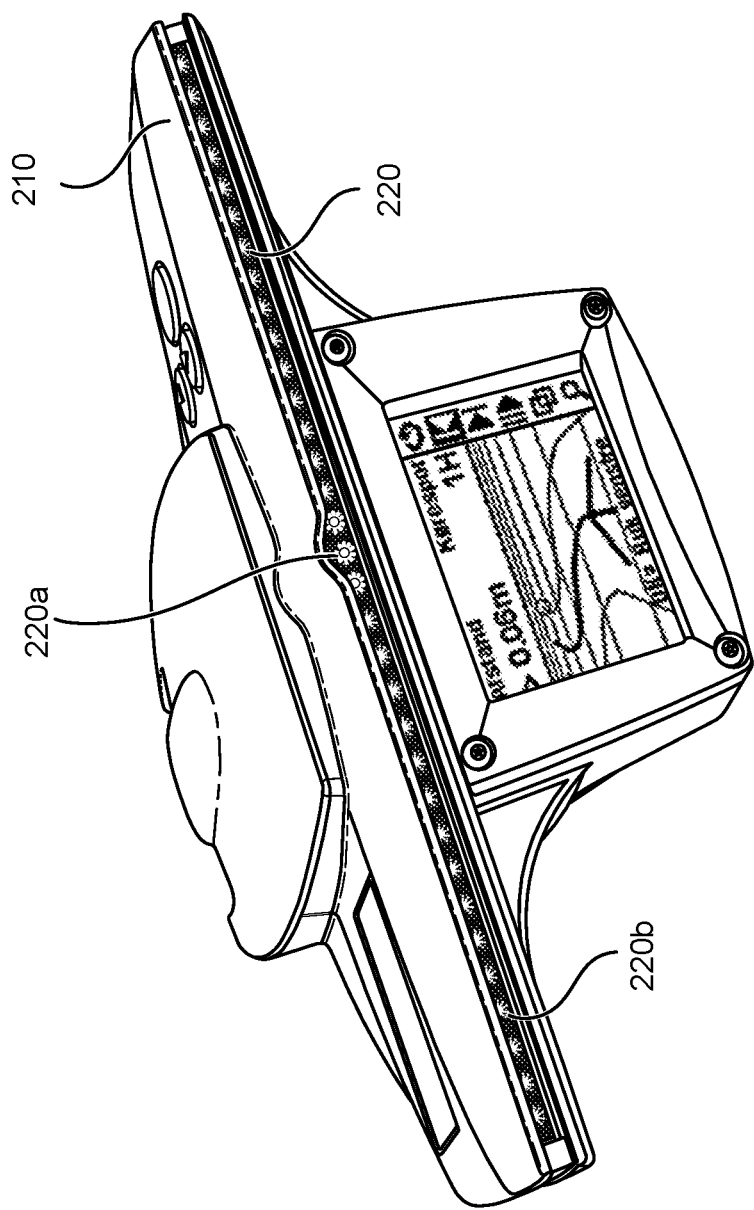
FIG. 2 shows an exemplary light bar that may be installed on a dashboard of a vehicle to indicate cross-track errors.

FIG. 2 shows an example of a light bar 210 that may be installed on a dashboard of the vehicle 110 to indicate the cross-track error 130. The light bar 210 may include multiple LED lights 220 arranged as a linear array. Depending on the magnitude of the cross-track error 130 and to which side of the pre-planned path 120 the cross-track error 130 is, different LED light 220 may be lit. For example, if the offline distance 130 is zero (i.e., the vehicle 110 is on the pre-planned path 120), the center LED light 220a may be lit. In some cases, the center LED light 220a may have a green color when lit, indicating to the human operator that the vehicle is on-track of the pre-planned path 120. If the vehicle 110 is to the left of the pre-planned path 120, one of the LED lights on the left side (e.g., the LED light 220b) may be lit—the greater the cross-track error 130, the farther the LED light from the center. In some cases, the LED lights off the center may have a red color when lit, indicating to the human operator that the vehicle is off-track of the pre-planned path 120. Thus, the light bar 210 may provide a visual guidance to the human operator so that the human operator may change the steering wheel angle accordingly in order to correct the cross-track error 130.

Figure 3:
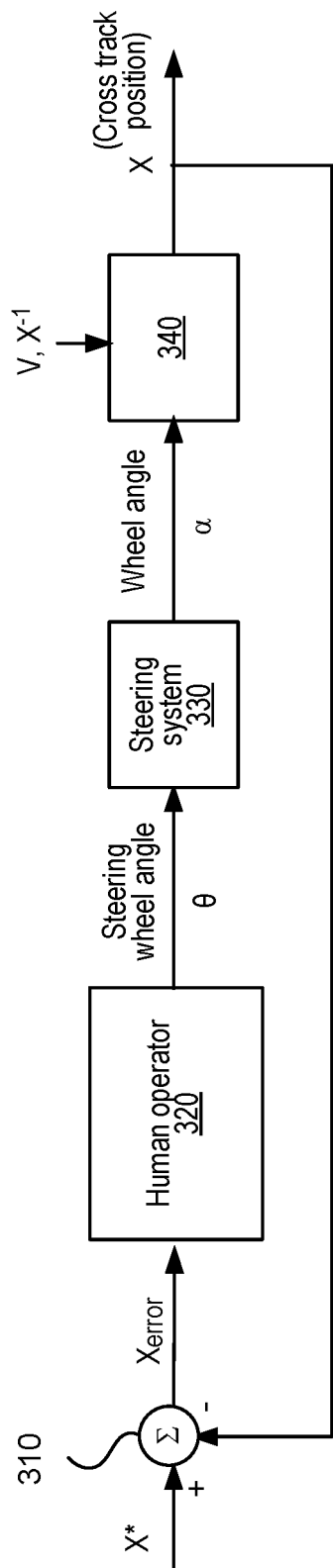
FIG. 3 illustrates a control loop in a manual guidance system.

FIG. 3 illustrates a control loop in an existing manual guidance system. At 310, the current cross-track position X of a vehicle is compared to an expected cross-track position X* of the vehicle according to a pre-planned path to obtain a cross-track error $X_{error}$. The current position X* of the vehicle may be determined, for example, by a global navigation satellite systems (GNSS) receiver attached to the vehicle. The cross-track error $X_{error}$ may be visually presented to a human operator 320 (e.g., displayed in a light bar as illustrated in FIG. 2). The human operator 320 may adjust the steering wheel angle θ according to the cross-track error $X_{error}$ in order to reduce the cross-track error. A steering system 330 of the vehicle may convert the rotation of the steering wheel (i.e., a change in the steering wheel angle θ) into a rotation of one or more road wheels of the vehicle (i.e., a change in the road wheel angle α in the yaw direction). It should be understood that the vehicle can be an on-road vehicle, or an agricultural vehicle such as a tractor. Thus, the term "road" wheel refers to a wheel of the vehicle that moves the vehicle on a surface of a ground, which can be a paved road or an unpaved road (e.g., a track in a field). At 340, an updated current cross-track position X is obtained according to the updated road wheel angle α, the current speed V of the vehicle, and the previous cross-track position $X^{-1}$ of the vehicle. The speed V of the vehicle may be determined, for example, using a three-axis accelerometer or the GNSS receiver. The updated cross-track position X is fed back to 310, and the cycle repeats.

The manual guidance system described above, however, provides only a visual indication of the cross-track error 130, which may be difficult for the human operator to use for adjusting the steering wheel angle in order to maintain a low cross-track error. For instance, in the example illustrated in FIGS. 1 and 2, the light bar 210 may indicate a cross-track error 130 to the left, thus prompting the human operator to steer the steering wheel to the right, although the steering wheel may very well be at the right angle to take the vehicle 110 to the pre-planned path 120. This may lead to overcorrection. As a result, the vehicle 110 may tend to follow a path 140 that meanders around the pre-planned path 120, as illustrated by the dash line 140 in FIG. 1.

According to some embodiments of the present invention, a manual guidance system may include sensors installed on a steering wheel of a vehicle for measuring the steering wheel angle directly, and estimate a desired steering wheel angle according to a pre-planned path. The desired steering wheel angle or a deviation of the current steering wheel angle from the desired steering wheel angle may be displayed so as to provide a visual guidance for a human operator to adjust the steering wheel angle accordingly. In some other embodiments, a manual guidance system may include sensors installed on one or more road wheels of the vehicle for measuring the road wheel angle in the yaw axis, and estimate a desired road wheel angle in the yaw axis according to a pre-planned path. Based on the desired road wheel angle in the yaw axis, a desired steering wheel angle may be estimated and displayed to provide visual guidance to a human operator. Because the manual guidance systems according to embodiments of the present invention provide indications of desired steering wheel angles, instead of cross-track errors, it may be easier for a human operator to adjust the steering wheel angle in order to maintain a low cross-track error.

Figure 4:
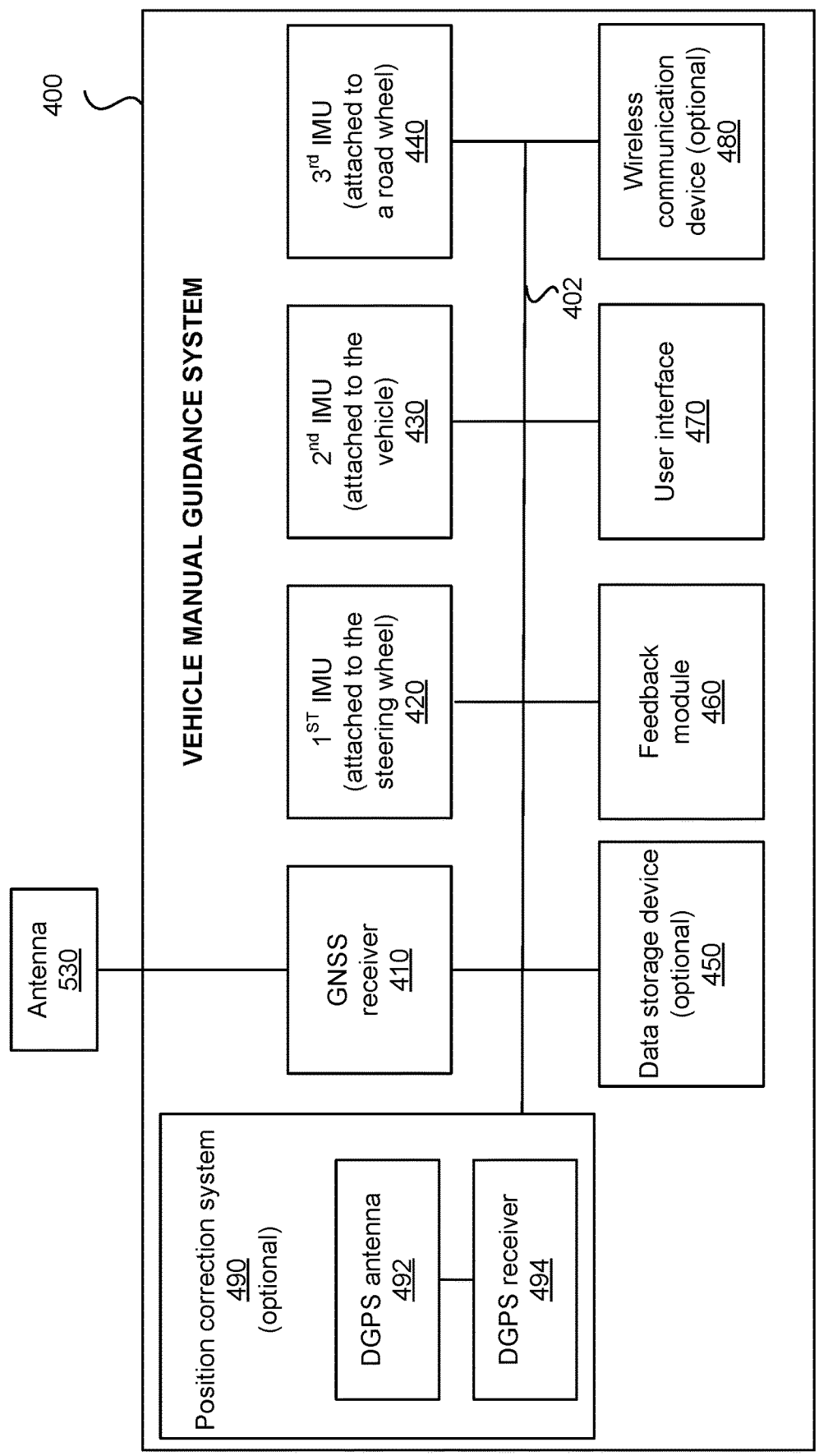
FIG. 4 shows a schematic block diagram of a manual guidance system for a vehicle according to some embodiments of the present invention.
Figure 5:
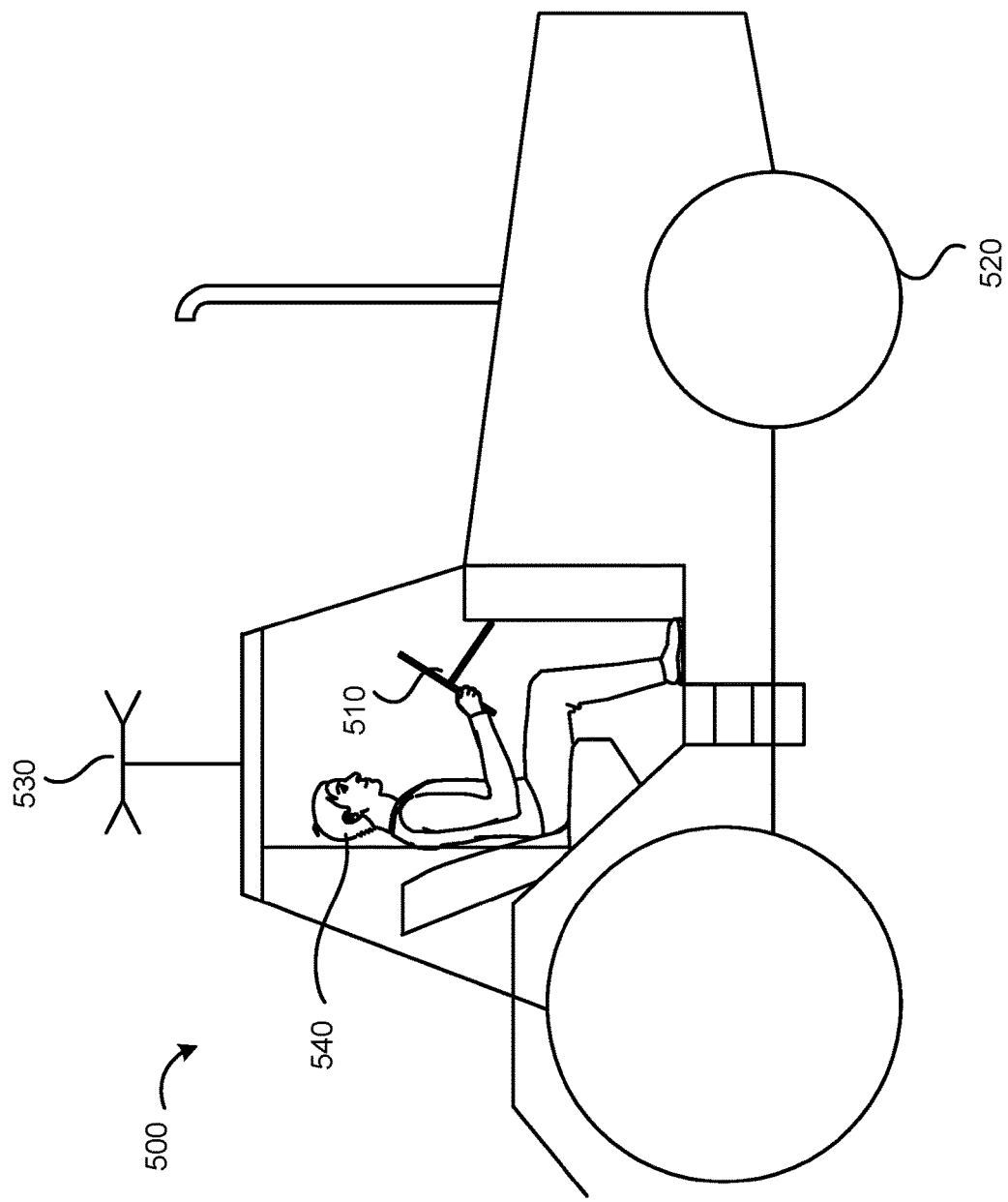
FIG. 5 illustrates a vehicle where the manual guidance system shown in FIG. 4 may be installed according to some embodiments of the present invention.

FIG. 4 shows a schematic block diagram of a manual guidance system 400 for a vehicle according to some embodiments of the present invention. FIG. 5 illustrates a vehicle 500 where the manual guidance system 400 may be installed. The vehicle 500 includes a steering wheel 510 and a plurality of road wheels 520. The vehicle 500 may also include an antenna 530 for receiving satellite signals from global navigation satellite systems (GNSS). The antenna 530 may be attached to a fixed part of the vehicle 500, such as the roof or the body of the vehicle. The vehicle 500 may be operated by a human operator 540.

Referring to FIGS. 4 and 5, the manual guidance system 400 may include a first inertial measurement unit (IMU) 420 attached to the steering wheel 510 of the vehicle 500. The first IMU 420 may include a three-axis accelerometer and a three-axis gyroscope. The first IMU 420 may be configured to detect linear accelerations of the steering wheel 510, and rotational rates of the steering wheel 510 in the pitch, roll, and yaw axis.

The manual guidance system 400 may further include a second IMU 430 attached to a fixed part of the vehicle 500. For example, the second IMU 430 may be attached to where the antenna 530 is attached to, or to the front or the back of the vehicle 500. The second IMU 430 may include a three-axis accelerometer and a three-axis gyroscope, and configured to detect linear accelerations of the vehicle, and rotational rates of the vehicle 500 in the pitch, roll, and yaw axis.

The manual guidance system 400 may further include a GNSS receiver 410 coupled to the antenna 530. The GNSS receiver 410 may be configured to determine a position of the vehicle 500 based on the satellite signals received from GNSS satellites. In some embodiments, the manual guidance system 400 may further include an optional position correction system 490. The position correction system 490 may include an antenna 492 and a receiver 494 for receiving correction data from a reference station or a network of reference stations. For example, the position correction system 490 may include a differential global positioning system (DGPS). The correction data may be used by the GNSS receiver 410 to determine a more precise position of the vehicle 500 (e.g., to millimeter or sub-millimeter accuracies). In some other embodiments, the GNSS receiver 410 may be an independent unit separate from the manual guidance system 400. In some embodiments, the second IMU 430 may reside inside the GNSS receiver 410, as some GNSS receivers include a built-in IMU.

The manual guidance system 400 may further include a data storage device 450. The data storage device 450 may store one or more pre-planned paths. The data storage device 450 may also store computer-executable instructions or other information. The data storage device 450 may comprise a volatile memory random access memory (RAM), or non-volatile data storage device such as a hard disk drive, flash memory or other optical or magnetic storage device.

The manual guidance system 400 further includes a feedback module 460. The feedback module 460 is coupled to the first IMU 420 and the second IMU 430. The feedback module 460 may be configured to determine a current angle of the steering wheel 510 relative to the vehicle 500 based on the readings of the first IMU 420, the readings of the second IMU 430, and a previous estimated angle of the steering wheel 510 relative to the vehicle 500.

For example, the gravity vector may be tracked based on the reading of the three-axis accelerometer of the first IMU 420. A rate of rotation of the steering wheel 510 in each of a roll axis, a pitch axis, and a yaw axis may be determined based on the readings of the three-axis gyroscope of the first IMU 420 and the gravity vector. A rate of rotation of the vehicle 500 in each of the roll axis, the pitch axis, and the yaw axis may be determined based on readings of the three-axis gyroscope of the second IMU 430. The rate of rotation of the vehicle 500 may be subtracted from the rate of rotation of the steering wheel 510 to determine a rate of rotation of the steering wheel 510 relative to the vehicle 500. The current angle of the steering wheel 510 can then be determined based on the previous estimated angle of the steering wheel 510 and the rate of rotation of the steering wheel 510 relative to the vehicle 500.

The feedback module 460 may be configured to determine a current heading of the vehicle 500 based on a previous estimated heading of the vehicle 500 and the readings of the second IMU 430. For example, a rate of rotation of the vehicle 500 in the yaw axis may be determined based on the readings of the three-axis gyroscope of the second IMU 430, which can be used to determine the current heading of the vehicle 500.

The feedback module 460 is also coupled to the GNSS receiver 410 and the data storage device 450. (In some embodiments, the data storage device 450 is optional and may be part of the feedback module 460.) The feedback module 460 may be configured to compare a current position of the vehicle 500 as determined by the GNSS receiver 410 to a pre-planned path stored in the storage device 450, and determine whether the current position of the vehicle 500 deviates from the pre-planned path and the amount of deviation if any.

The feedback module 460 may be further configured to determine a current velocity of the vehicle 500 based on readings of the accelerometers of the second IMU 430. The velocity of the vehicle may include a ground speed and a yaw rate. Alternatively, the feedback module 460 may be configured to determine the current velocity of the vehicle 500 based on GNSS signals received by the GNSS receiver 410.

The feedback module 460 may be further configured to determine a desired angle of the steering wheel 510 based on the current angle of the steering wheel 510, the amount of deviation from the pre-planned path, the current heading of the vehicle 500, and the current velocity of the vehicle 500. In some embodiments, the feedback module 460 may leverage on some existing automatic pilot algorithms for determining the desired angle of the steering wheel 510.

The manual guidance system 400 may further include a user interface 470 coupled to the feedback module 460. The user interface 470 may be configured to present visual information relating to the desired angle of the steering wheel 510, or the deviation of the current angle of the steering wheel 510 from the desired angle of the steering wheel 510, therefore providing visual guidance to the human operator 540 for adjusting the steering wheel angle accordingly so that the vehicle 500 may follow the pre-planned path.

Although the various components of the manual guidance system 400 are shown to be connected to each other via a bus 402 in FIG. 4, this is not required. In some embodiments, the manual guidance system 400 may include a wireless communication device 480, using for example Bluetooth or Wi-Fi technologies. The feedback module 460 may be coupled to the GNSS receiver 410, the first IMU 420, and the second IMU 430 wirelessly via the wireless communication device 480. In some embodiments, the feedback module 460 and the user interface 470 may reside in a portable electronic device, such as a smart phone.

Figure 6:
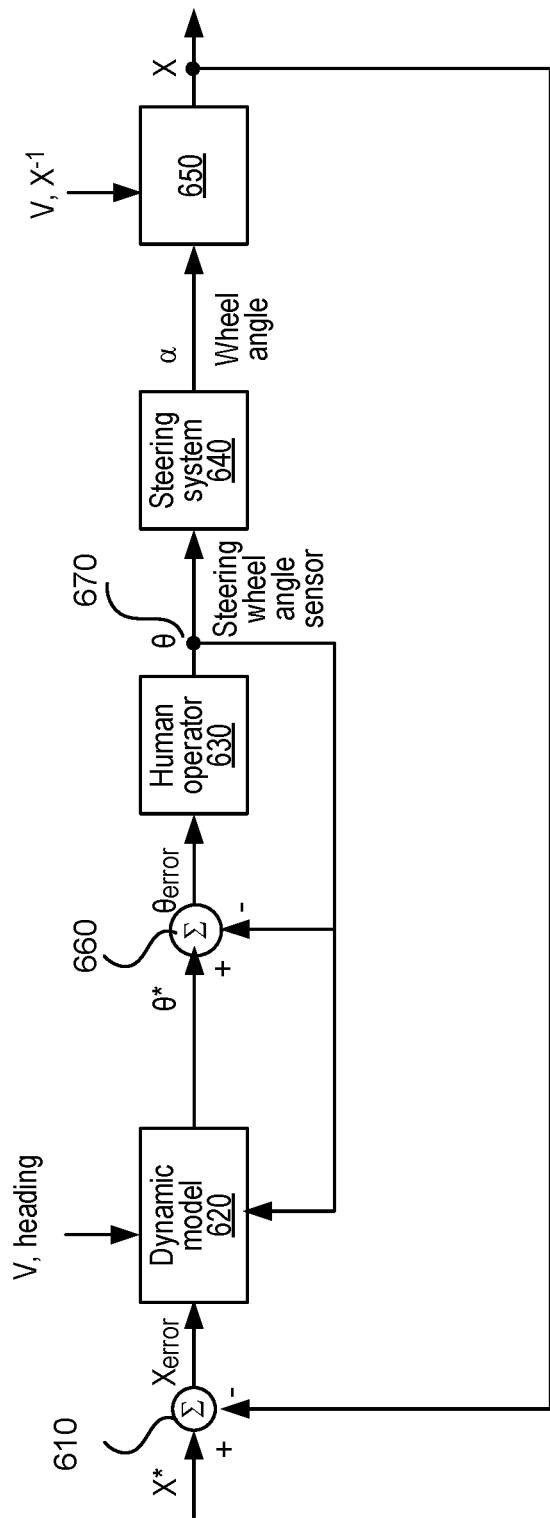
FIG. 6 illustrates a control loop for manual guidance of a vehicle according to some embodiments of the present invention.

FIG. 6 illustrates a control loop of a manual guidance system for a vehicle (e.g., as illustrated in FIG. 4) according to some embodiments of the present invention. At 610, the current position X of the vehicle is compared to an expected position X* of the vehicle according to a pre-planned path to obtain a cross-track error $X_{error}$. A dynamic model 620 takes the cross-track error $X_{error}$, a current velocity V of the vehicle, a current heading of the vehicle, and a current steering wheel angle θ as measured by a steering wheel angle sensor (e.g., an IMU) at 670, as inputs, and determines a desired steering wheel angle θ*. At 660, the current steering wheel angle θ is compared to the desired steering wheel angle θ* to obtain a steering wheel angle error $θ_{error}$. The desired steering wheel angle θ*, or the steering wheel angle error $θ_{error}$, may be visually presented to a human operator 630. The human operator 630 may adjust the steering wheel angle θ according to the desired steering wheel angle θ* or the steering wheel angle error $θ_{error}$. A steering system 640 of the vehicle may translate the rotation of the steering wheel (i.e., a change in the steering angle θ) into a rotation of a road wheel of the vehicle in the yaw axis (i.e., a change in the road wheel angle α). At 650, an updated cross-track position X is obtained according to the updated road wheel angle α, the current speed V of the vehicle, and the previous cross-track position $X^{-1}$ of the vehicle. The dynamic model 620 may be part of the feedback module 460 as illustrated in FIG. 4. In some embodiments, the dynamic model 620 may leverage some existing automatic pilot algorithms.

Since the relationship between the a change in the steering wheel angle θ and a change in the road wheel angle α may not be linear, it may be advantageous to measure the road wheel angle α instead of or in addition to measuring the steering wheel angle θ. Referring again to FIGS. 4 and 5, according to some other embodiments of the present invention, the manual guidance system 400 may further include a third IMU 440 attached to a road wheel 520 of the vehicle 500. The third IMU 440 may replace the second IMU 430 or in addition to the second IMU 430. The third IMU 440 may include a three-axis accelerometer and a three-axis gyroscope. The third IMU 440 may be configured to detect linear accelerations of the road wheel 520, and rotational rates of the road wheel 520 along the pitch, roll, and yaw axis.

The feedback module 460 is coupled to the third IMU 440 and may be configured to determine a current road wheel angle α (in the yaw axis) relative to the vehicle 500 based on the readings of the third IMU 440 and the second IMU 430, and a previous estimated road wheel angle $α^{-1}$. For example, the gravity vector may be tracked based on the reading of the three-axis accelerometer of the third IMU 440. A rate of rotation of the road wheel 520 in each of a roll axis, a pitch axis, and a yaw axis may be determined based on the readings of the three-axis gyroscope of the third IMU 440 and the gravity vector. The rate of rotation of the road wheel 520 relative to the vehicle 500 may be obtained by subtracting the rate of rotation of the vehicle 500 from the rate of rotation of the road wheel 520. The current road wheel angle α may then be determined based on a previous estimated road wheel angle $α^{-1}$ and the rate of rotation of the road wheel 520 relative to the vehicle 500 in the yaw axis. The feedback module 460 may be configured to determine a desired angle of the steering wheel 510 based on the current road wheel angle α, the amount of deviation from the pre-planned path, the current heading of the vehicle 500, and the current velocity of the vehicle 500.

Figure 7:
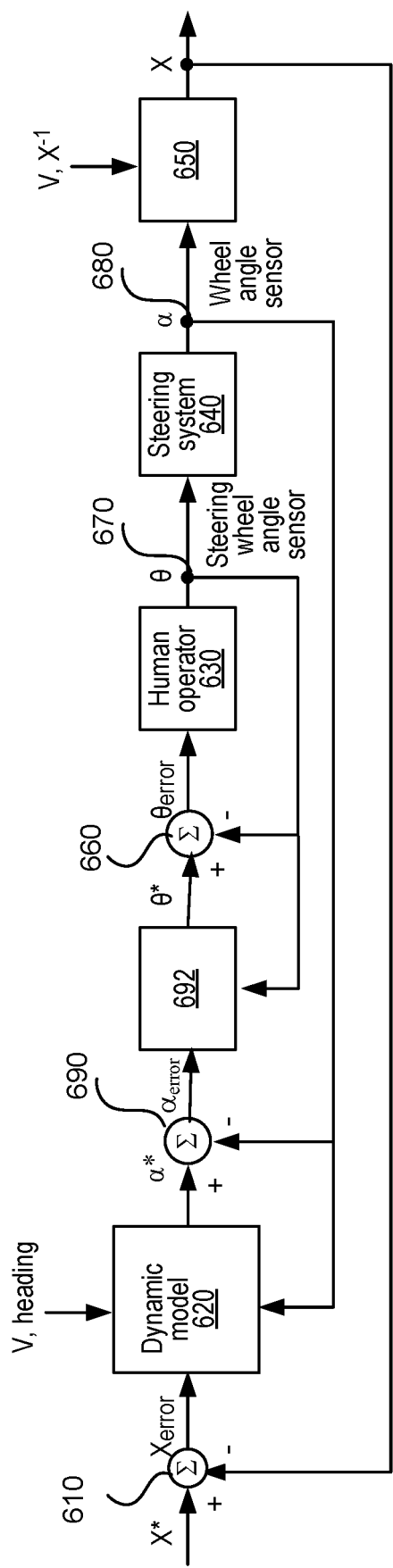
FIG. 7 illustrates a control loop for manual guidance of a vehicle according to some other embodiments of the present invention.

FIG. 7 illustrates a control loop for manual guidance of a vehicle according to some other embodiments. At 610, the current position X of the vehicle is compared to an expected position X* of the vehicle according to a pre-planned path to obtain a cross-track error $X_{error}$. A dynamic model 620 may take the cross-track error $X_{error}$, a current velocity V of the vehicle, a current heading of the vehicle, and a current road wheel angle α as measured by a road wheel angle sensor at 680, as inputs, and may determine a desired road wheel angle α*. At 690, the current road wheel angle α is compared to the desired road wheel angle α* to obtain a road wheel angle error $α_{error}$. At 692, a desired steering wheel angle θ* is determined based on the road wheel angle error $α_{error}$ and the current steering wheel angle θ as measured by the steering wheel angle sensor at 670. At 660, the current steering wheel angle θ is compared to the desired steering wheel angle θ* to obtain a steering wheel angle error $θ_{error}$. The desired steering wheel angle θ*, or the steering wheel angle error $θ_{error}$, may be visually presented to the human operator 630. The human operator 630 may adjust the steering wheel angle θ according to the desired steering wheel angle θ* or the steering wheel angle error $θ_{error}$. The steering system 640 of the vehicle may translate the rotation of the steering wheel (i.e., a change in the steering angle θ) into a rotation of the road wheel in the yaw axis (i.e., a change in the road wheel angle α). At 650, an updated cross-track position X is obtained according to the updated road wheel angle α, the current speed V of the vehicle, and the previous cross-track position XI of the vehicle.

In some embodiments, alight bar, similar to the light bar 210 illustrated in FIG. 2, may be used for providing visual guidance to a human operator. Here, the light bar 210 would indicate the steering wheel angle error $θ_{error}$, instead of cross-track error ΔX. For example, if the steering wheel angle error $θ_{error}$ is zero (i.e., the steering wheel angle θ is at the desired steering wheel angle θ*), the center LED light 220a may be lit. In some cases, the center LED light 220a may have a green color when lit, indicating to the human operator that the steering wheel angle θ is at the desired steering wheel angle θ*. If the steering wheel angle θ is to the left of the desired steering wheel angle θ*, one of the LED lights on the left side (e.g., the LED light 220b) may be lit—the greater the steering wheel angle error θ, the farther the LED light from the center. In some cases, the LED lights off the center may have a red color when lit, alerting to the human operator that a correction to the steering wheel angle θ may be needed. Here, because the light bar 210 indicates the steering wheel angle error $θ_{error}$, instead of the cross-track error, it provides a more direct visual guidance to the human operator as how to adjust the steering wheel angle in order to maintain a low cross-track error.

According to some other embodiments, a plurality of LED lights may be positioned around the perimeter of the steering wheel. One of the LED lights may be lit to indicate that the desired steering wheel angle is such that the lit LED light should be facing up.

Figure 8:
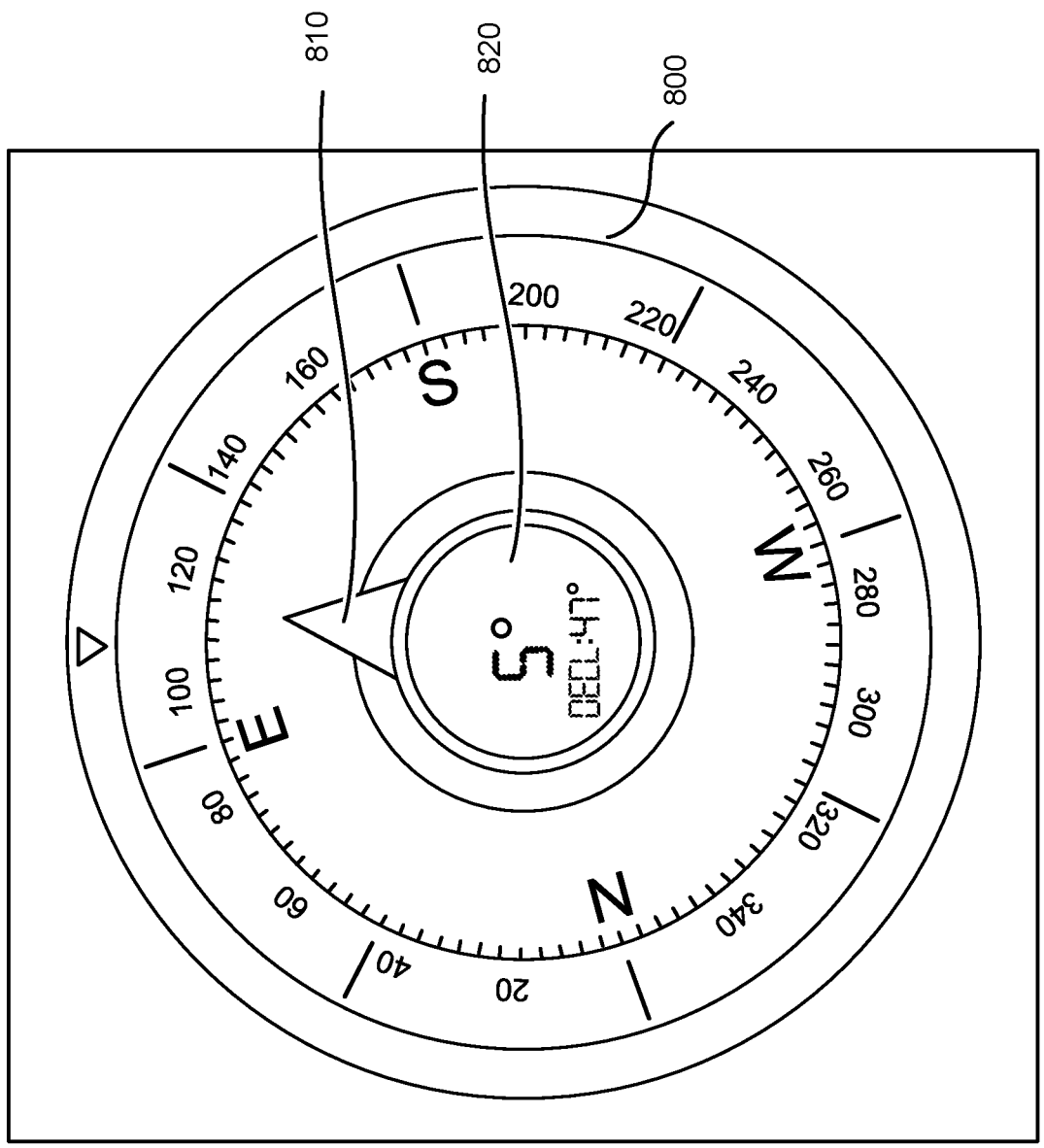
FIG. 8 shows an exemplary user interface for providing visual guidance to a human operator of a vehicle according to some embodiments of the present invention.

FIG. 8 shows an exemplary user interface for providing visual guidance to a human operator of a vehicle according to some embodiments. The user interface shows a compass 800, where the arrow 810 may indicate the desired orientation of the steering wheel. A central display area 820, may show the steering wheel angle error $\theta_{error}$ in degrees. The arrow 810 may provide a direct command to the human operator as how to steer the steering wheel so as to correct the steering wheel angle error $\theta_{error}$.

Figure 9:
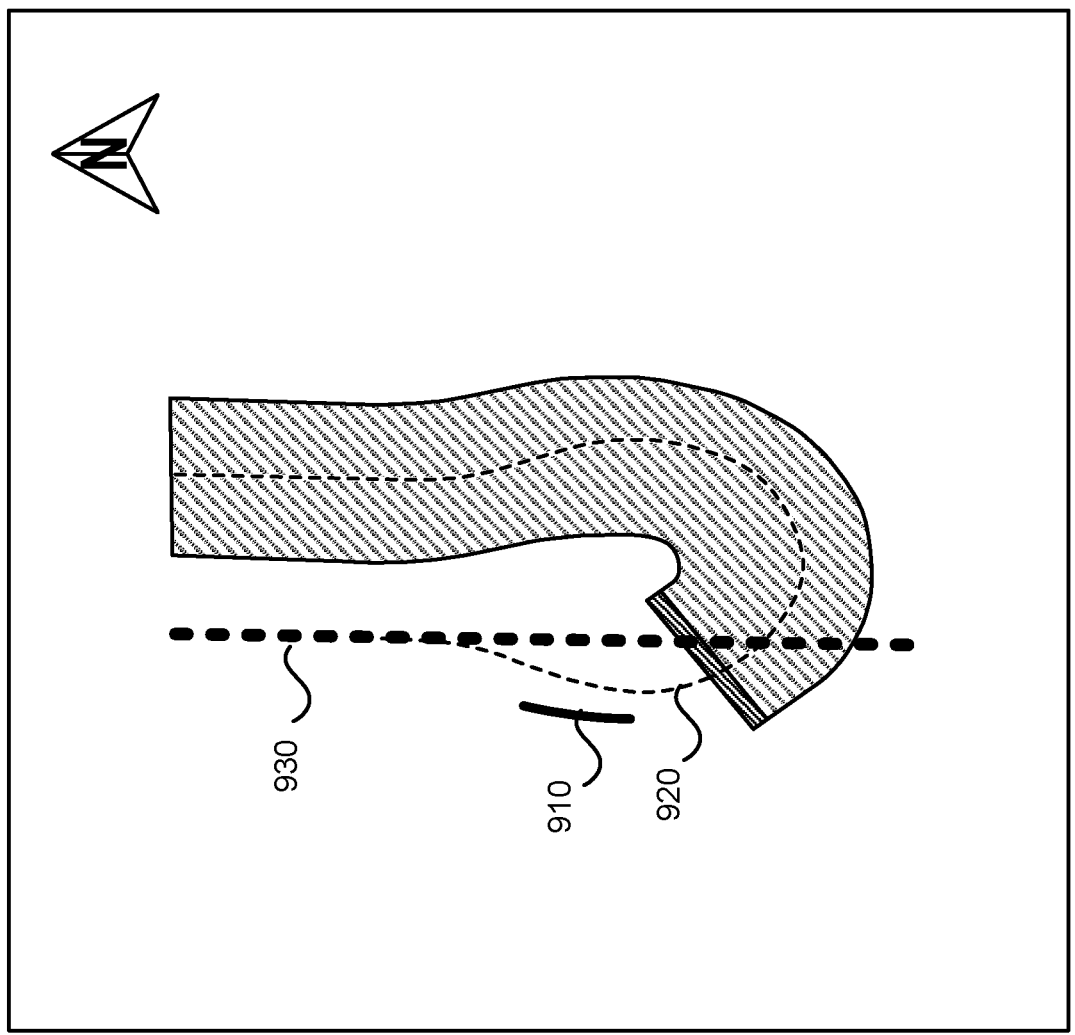
FIG. 9 shows an exemplary user interface for providing visual guidance to a human operator of a vehicle according to some other embodiments of the present invention.

FIG. 9 shows an exemplary user interface for providing visual guidance to a human operator of a vehicle according to some other embodiments. The user interface includes a display 900 that shows a projected path 910 (the solid line) of the vehicle that may vary in real time based on the current steering wheel angle, superimposed on a desired path 920 (the thin dashed line) and a guidance line 930 (the thick dashed line). The shaded region indicates a swath covered by the vehicle's path. For instance, in the example illustrated in FIG. 9, the projected path 910 is shown to be on the left side of the desired path 920. Thus, a human operator may adjust the steering wheel accordingly to steer the vehicle toward the right so that projected path 910 may stay on the desired path 920.

In some embodiments, the various user interfaces discussed above may be used in combination. For example, a user interface may both indicate the desired orientation of the steering wheel in a light bar (e.g., similar to FIG. 2) or in a compass (e.g., as illustrated in FIG. 8), and display the projected path based on the current steering wheel angle superimposed on a desired path (e.g., as illustrated in FIG. 9).

Figure 10:
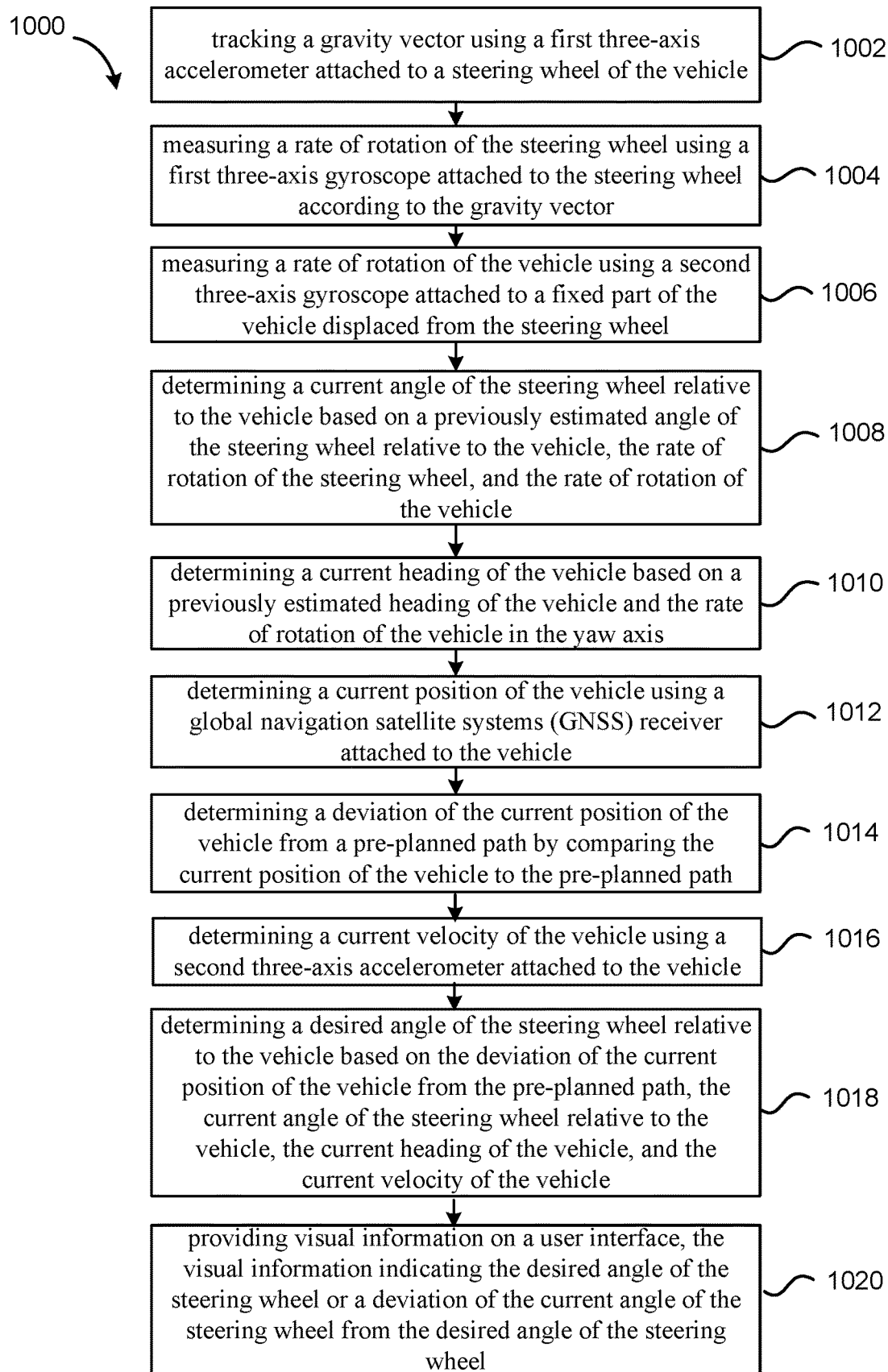
FIG. 10 is a simplified flowchart illustrating a method of providing manual guidance to an operator of a vehicle according to some embodiments of the present invention.

FIG. 10 is a simplified flowchart illustrating a method 1000 of providing manual guidance to an operator of a vehicle according to some embodiments. The method may include, at 1002, tracking a gravity vector using a first three-axis accelerometer attached to a steering wheel of the vehicle; at 1004, measuring a rate of rotation of the steering wheel in each of a roll axis, a pitch axis, and a yaw axis using a first three-axis gyroscope attached to the steering wheel according to the gravity vector; at 1006, measuring a rate of rotation of the vehicle in each of the roll axis, the pitch axis, and the yaw axis using a second three-axis gyroscope attached to a fixed part of the vehicle displaced from the steering wheel; and at 1008, determining a current angle of the steering wheel relative to the vehicle based on a previously estimated angle of the steering wheel relative to the vehicle, the rate of rotation of the steering wheel in each of the roll axis, the pitch axis, and the yaw axis, and the rate of rotation of the vehicle in each of the roll axis, the pitch axis, and the yaw axis. The method 1000 may further include, at 1010, determining a current heading of the vehicle based on a previously estimated heading of the vehicle and the rate of rotation of the vehicle in the yaw axis; at 1012, determining a current position of the vehicle using a global navigation satellite systems (GNSS) receiver attached to the vehicle; at 1014, determining a deviation of the current position of the vehicle from a pre-planned path by comparing the current position of the vehicle to the pre-planned path; and at 1016, determining a current velocity of the vehicle using a second three-axis accelerometer attached to the vehicle. The method 1000 further includes, at 1018, determining a desired angle of the steering wheel relative to the vehicle based on the deviation of the current position of the vehicle from the pre-planned path, the current angle of the steering wheel relative to the vehicle, the current heading of the vehicle, and the current velocity of the vehicle; and at 1020, providing visual information on a user interface. The visual information may indicate the desired angle of the steering wheel or a deviation of the current angle of the steering wheel from the desired angle of the steering wheel. The visual information may provide visual guidance to the operator of the vehicle for adjusting an angle of the steering wheel so that the vehicle follows the pre-planned path.

It should be appreciated that the specific steps illustrated in FIG. 10 provide a particular method of providing manual guidance to an operator of a vehicle according to some embodiments of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A system for providing manual guidance of a vehicle, the system comprising:
   a first inertial measurement unit (IMU) attached to a road wheel of the vehicle, the first IMU comprising a first three-axis accelerometer and a first three-axis gyroscope;
   a second IMU attached to a fixed part of the vehicle displaced from the road wheel, the second IMU comprising a second three-axis accelerometer and a second three-axis gyroscope;
   a third IMU attached to a steering wheel of the vehicle, the third IMU comprising a third three-axis accelerometer and a third three-axis gyroscope;
   a global navigation satellite systems (GNSS) receiver attached to the vehicle and configured to receive GNSS satellite signals and determine a current position of the vehicle based on the GNSS satellite signals;
   a non-transitory electronic data storage device configured to store a pre-planned path; and
   a user interface comprising one or more of a display, lightbar, and/or compass, and configured to provide visual information to an operator of the vehicle for adjusting an angle of the steering wheel so that the vehicle follows the pre-planned path;
   wherein the system is configured to:
      determine a current angle of the road wheel in a yaw axis relative to the vehicle based on a previously estimated angle of the road wheel in the yaw axis relative to the vehicle, readings of the first IMU, and readings of the second IMU;
      determine a current heading of the vehicle based on a previously estimated heading of the vehicle and the readings of the second IMU;
      determine a deviation of the current position of the vehicle from the pre-planned path by comparing the current position of the vehicle to the pre-planned path;

determine a current velocity of the vehicle based on readings of the second IMU;

determine a desired angle of the road wheel in the yaw axis relative to the vehicle based on the current angle of the road wheel in the yaw axis relative to the vehicle, the deviation of the current position of the vehicle from the pre-planned path, the current heading of the vehicle, and the current velocity of the vehicle determine a current angle of the steering wheel relative to the vehicle based on a previously estimated angle of the steering wheel relative to the vehicle, readings of the third IMU, and the readings of the second IMU;

determine a desired angle of the steering wheel relative to the vehicle based on the desired angle of the road wheel, and the current angle of the road wheel; and provide the visual information, via the user interface, indicating one or more of: (a) the desired angle of the road wheel in the yaw axis or a deviation of the current angle of the road wheel in the yaw axis from the desired angle of the road wheel in the yaw axis,-and/or (b) the desired angle of the steering wheel or a deviation of the current angle of the steering wheel from the desired angle of the steering wheel.

2. The system of claim 1 further configured to determine the current angle of the road wheel in the yaw axis relative to the vehicle by:

determining a gravity vector based on readings of the first three-axis accelerometer of the first IMU;

determining a rate of rotation of the road wheel in each of a roll axis, a pitch axis, and the yaw axis based on the gravity vector and readings of the first three-axis gyroscope of the first IMU;

determining a rate of rotation of the vehicle in each of the roll axis, the pitch axis, and the yaw axis, based on readings of the second three-axis gyroscope of the second IMU;

determining a rate of rotation of the road wheel relative to the vehicle based on the rate of rotation of the road wheel in each of the roll axis, the pitch axis, and the yaw axis, and the rate of rotation of the vehicle in each of the roll axis, the pitch axis, and the yaw axis; and determining the current angle of the road wheel in the yaw axis relative to the vehicle based on the previously estimated angle of the road wheel in the yaw axis relative to the vehicle and the rate of rotation of the road wheel relative to the vehicle.

3. The system of claim 1 wherein the first IMU, the second IMU, the third IMU, and the GNSS receiver are each configured to communicate via wireless communication.

4. The system of claim 1 further configured to determine the current heading of the vehicle by:

determining a gravity vector based on readings of the second three-axis accelerometer of the second IMU;

determining a rate of rotation of the vehicle in a yaw axis based on readings of the second three-axis gyroscope of the second IMU; and determining the current heading of the vehicle based on the previously estimated heading of the vehicle and the rate of rotation of the vehicle in the yaw axis.

5. The system of claim 1 further configured to determine the current velocity of the vehicle based on readings of the second three-axis accelerometer of the second IMU.

6. The system of claim 1 wherein the second IMU and the GNSS receiver are collocated.

7. The system of claim 1 wherein at least the user interface resides in a portable electronic device.

8. The system of claim 7 wherein the portable electronic device comprises a smart phone.

9. The system of claim 1 wherein the user interface further comprises a plurality of light-emitting diodes (LEDs), and wherein at least one of the plurality of LEDs is selectively lit to indicate the visual information.

10. A method of providing manual guidance to an operator of a vehicle, the method comprising:

tracking a gravity vector using a first three-axis accelerometer attached to a road wheel of the vehicle;

measuring a rate of rotation of the road wheel in each of a roll axis, a pitch axis, and a yaw axis using a first three-axis gyroscope attached to the road wheel according to the gravity vector;

measuring a rate of rotation of the vehicle in each of the roll axis, the pitch axis, and the yaw axis using a second three-axis gyroscope attached to a fixed part of the vehicle displaced from the road wheel;

measuring a rate of rotation of the steering wheel of the vehicle in each of the roll axis, the pitch axis, and the yaw axis using a third three-axis gyroscope attached to the steering wheel according to the gravity vector;

determining a current angle of the road wheel relative to the vehicle based on a previously estimated angle of the road wheel relative to the vehicle, the rate of rotation of the road wheel in each of the roll axis, the pitch axis, and the yaw axis, and the rate of rotation of the vehicle in each of the roll axis, the pitch axis, and the yaw axis;

determining a current heading of the vehicle based on a previously estimated heading of the vehicle and the rate of rotation of the vehicle in the yaw axis;

determining a current position of the vehicle using a global navigation satellite systems (GNSS) receiver attached to the vehicle;

determining a deviation of the current position of the vehicle from a pre-planned path by comparing the current position of the vehicle to the pre-planned path;

determining a current velocity of the vehicle using a second three-axis accelerometer attached to the vehicle;

determining a desired angle of the road wheel relative to the vehicle based on the deviation of the current position of the vehicle from the pre-planned path, the current angle of the road wheel relative to the vehicle, the current heading of the vehicle, and the current velocity of the vehicle;

determining a current angle of the steering wheel in the yaw axis relative to the vehicle based on a previously estimated angle of the steering wheel in the yaw axis relative to the vehicle, and the rate of rotation of the steering wheel in the yaw axis;

determining a desired angle of the steering wheel relative to the vehicle based on the desired angle of the road wheel, and the current angle of the road wheel; and providing visual information on a user interface comprising one or more of a display, lightbar, and/or compass, wherein the user interface is configured to provide the visual information to an operator of the vehicle for adjusting an angle of the steering wheel so that the vehicle follows the pre-planned path, and wherein the visual information indicates one or more of: (a) the desired angle of the road wheel or a deviation of the current angle of the road wheel from the desired angle of the road wheel, and/or (b) the desired angle of the steering wheel or a deviation of the current angle of the steering wheel from the desired angle of the steering wheel.

11. The method of claim 10 wherein the user interface further comprises a plurality of light-emitting diodes (LEDs), and wherein providing the visual information comprises causing at least one of the plurality of LEDs to be selectively lit.

12. The method of claim 11 wherein the plurality of LEDs are arranged as a linear array or along a perimeter of the steering wheel.

* * * * *